(12) United States Patent
Hamad et al.

(10) Patent No.: US 10,081,880 B2
(45) Date of Patent: Sep. 25, 2018

(54) CELLULOSE NANOCRYSTAL (CNC) FILMS AND CONDUCTIVE CNC-BASED POLYMER FILMS PRODUCED USING ELECTROCHEMICAL TECHNIQUES

(71) Applicant: FPINNOVATIONS, Pointe-Claire (CA)

(72) Inventors: Wadood Y. Hamad, Vancouver (CA); Siham Atifi, Vancouver (CA); Neville J. Stead, Delta (CA)

(73) Assignee: FPInnovations, Pointe-Claire, Quebec (CA)

( * ) Notice: Subject to any disclaimer, the term of this patent is extended or adjusted under 35 U.S.C. 154(b) by 458 days.

(21) Appl. No.: 14/889,466

(22) PCT Filed: May 6, 2014

(86) PCT No.: PCT/CA2014/050430
§ 371 (c)(1),
(2) Date: Nov. 6, 2015

(87) PCT Pub. No.: WO2014/179881
PCT Pub. Date: Nov. 13, 2014

(65) Prior Publication Data
US 2016/0108537 A1  Apr. 21, 2016

Related U.S. Application Data

(60) Provisional application No. 61/819,905, filed on May 6, 2013.

(51) Int. Cl.
C25D 13/18 (2006.01)
C08J 5/18 (2006.01)
(Continued)

(52) U.S. Cl.
CPC ............. C25D 13/18 (2013.01); C08J 5/18 (2013.01); C09D 5/44 (2013.01); C09K 19/02 (2013.01);
(Continued)

(58) Field of Classification Search
CPC ........ C25D 13/18; C25D 13/22; C09K 19/02; C09K 19/3819
See application file for complete search history.

(56) References Cited

U.S. PATENT DOCUMENTS 4,496,436 A   1/1985  Inoue
4,789,437 A  12/1988  Sing et al.
(Continued)

FOREIGN PATENT DOCUMENTS

WO   WO-2010124378 A1 * 11/2010 ............. B29C 41/24
WO   WO-2011140658 A1 * 11/2011 ................ C08J 5/18

OTHER PUBLICATIONS

Besra et al. "Bubble-free Aqueous Electrophoretic Deposition (EPD) by Pulse-Potential Application", 2008, vol. 91, p. 3154-3159.*
(Continued)

Primary Examiner — Gerard Higgins
(74) Attorney, Agent, or Firm — Norton Rose Fulbright Canada LLP

(57) ABSTRACT

The present describes a chiral nematic cellulose nanocrystal (CNC) film comprising: cellulose nanocrystals that self-assemble to form an iridescent CNC structure, wherein the self-assembled structure comprises a finger-print pattern of repeating bright and dark regions, defining a pitch of the iridescent film, where the pitch variable. Also described are conductive polymer nanocomposite based on the CNC film. Further described is the electrophoretic method of producing the chiral nematic cellulose nanocrystal film as well as the polymer nanocomposites and the apparatus used.

15 Claims, 8 Drawing Sheets

(51) Int. Cl.
  *C09D 5/44* (2006.01)
  *C09K 19/02* (2006.01)
  *C09K 19/38* (2006.01)
  *C25D 13/22* (2006.01)
  *H01B 1/12* (2006.01)

(52) U.S. Cl.
  CPC .......... *C09K 19/3819* (2013.01); *C25D 13/22* (2013.01); *H01B 1/124* (2013.01); *C08J 2301/02* (2013.01); *C08J 2479/02* (2013.01); *Y10T 428/24802* (2015.01)

(56) References Cited

U.S. PATENT DOCUMENTS

| | | | | |
|---|---|---|---|---|
| 8,398,901 | B2 * | 3/2013 | Beck | B82Y 20/00 264/1.34 |
| 9,384,867 | B2 * | 7/2016 | Hamad | C08L 79/02 |
| 2005/0205425 | A1 | 9/2005 | Palumbo et al. | |
| 2010/0151159 | A1 * | 6/2010 | Beck | B82Y 20/00 428/30 |

OTHER PUBLICATIONS

Iridescent Chiral Nematic Cellulose Nanocrystal/Polymer Composites Assembled in Organic Solvents, Clement C.Y. Cheung et al., ACS Macro Lett., 2013, 2(11), pp. 1016-1020, Publication Date (web): Nov. 1, 2013.
Chiral Nematic Phase Formation by Aqueous Suspensions os Cellulose Nanocrystals Prepared by Oxidationwith Ammonium Presulfate, Castro-Gerrero et al., Department of Chemistry, Pulp and Paper Research Center, McGill University, May 2014.
Electrophoretic Deposition of Cellulose Nanocrystals (CNs) and CNs/Alginate Nanocomposite Coatings and Free Standing Membranes, Chen Q. et al., Colloids Surf B Biointerfaces, Jun. 1, 2014, 118:41-8.
Cellulose Nanocrystals: Chemistry, Self-Assembly, and Applications, Youssef Habibi et al., Chem. Rev. 2010, 110, pp. 3479-3500.
ISR of corresponding PCT application PCT/CA2014/050430.

* cited by examiner

CELLULOSE NANOCRYSTAL (CNC) FILMS AND CONDUCTIVE CNC-BASED POLYMER FILMS PRODUCED USING ELECTROCHEMICAL TECHNIQUES

CROSS-REFERENCE TO RELATED APPLICATIONS

This application is a National entry of PCT/CA2014/050430 filed May 6, 2014, in which the United States of America was designated and elected, and which remains in the International phase until Nov. 6, 2015, which application in turn claims priority under 35 USC 119(e) from U.S. Provisional Application Ser. No. 61/819,905, filed May 6, 2013.

FIELD OF THE INVENTION

The present invention relates to a method for producing a chiral nematic cellulose nanocrystal film and a nanocomposite conductive film based on the chiral nematic CNC film and a conductive polymer and an apparatus used for producing the film and composite.

BACKGROUND ART

Electrophoretic deposition (EPD) is one of the electrochemical processes attracting increasing interest as an efficient material processing technique for producing films and coatings from colloidal suspensions. EPD is commonly used in processing of ceramics, coatings and composite materials. Interest in the EPD technique is driven not only by its applicability to a wide range of materials but also by its simplicity and cost-effectiveness. It essentially requires simple equipment, as well as being amenable to scaling-up.

Electrophoretic deposition is achieved via the motion of charged particles, dispersed in a suitable solvent, towards an electrode of opposite charge under an applied electric field. This process results in the accumulation of particles and the formation of a homogeneous and rigid deposit at the deposition electrode. Beyond its application for production of functional and composite ceramics, layered and functionally graded materials, composite coatings and biomaterials, EPD has also been used for deposition of nanoparticles such as carbon nanotubes to produce advanced nanostructured materials. It has been reported that large scale, homogeneous multi-walled carbon nanotube (MWCNT) films with good electrical and field emission properties were obtained using EPD for 2 minutes under DC voltage of 200-300V.

Pulse electrophoretic deposition method is one of several EPD techniques. In this method, an electric current in the form of series of pulses is passed between two electrodes instead of a constant DC current. U.S. Pat. No. 4,496,436 discloses an improved pulse method for electrodeposition and an apparatus for carrying out this method. In another report, the application of pulse potential of suitable width to an aqueous suspension of alumina enables obtaining smooth and bubble-free deposit; however, the application of continuous DC resulted in incorporation of bubbles in the deposit. Furthermore, U.S. Pat. No. 4,789,437 discloses a pulse electroplating process for producing crack-free rhodium electrodeposits on different metal substrates and to form electrochemically thin rhodium sheets or foils. U.S. Patent application No. 2005/0205425 A1 discloses a process involving pulse electrodeposition for forming coatings of nano-crystalline metals, metal alloys or metal matrix composites where the process can be applied to establish wear-resistant coatings and foils of pure metals or alloys of metals.

There is a need for low cost stable chiral nematic films of cellulose nanocrystals, preferably produced by a simplified ecofriendly process.

SUMMARY

In accordance with one aspect of the present invention, there is provided a method for producing a chiral nematic cellulose nanocrystal film comprising: providing a functionalized cellulose nanocrystal suspension; providing an electrophoretic deposition system comprising a working electrode; a counter electrode; a DC power supply and a controller, wherein the working electrode, the counter electrode, the power supply and the controller are operatively connected to produce a pulsed signal, immersing the working electrode and the counter electrode in the cellulose nanocrystal suspension/solution; and applying a voltage of at least 10V across the deposition system to deposit the film on the working electrode.

In accordance with one aspect of the method herein described, the voltage applied across the deposition system is at least 30 V.

In accordance with another aspect of the method herein described, the pulsed signal is a constant voltage square-wave pulse.

In accordance with yet another aspect of the method herein described, pulsed signal has a pulse width $T_{on}$ from 1 to 10 milliseconds and a $T_{off}$ from 4 to 10 milliseconds.

In accordance with still another aspect of the method herein described, the film is dried for at least 5 minutes at 100° C. to produce a dry chiral nematic cellulose nanocrystal film.

In accordance with yet still another aspect of the method herein described, further comprising providing a conductive monomer solution; immersing the working electrode in the monomer solution, and electropolymerizing the conductive monomer by potentiostatic voltammetry.

In accordance with a further aspect of the method herein described, the conductive monomer is an aniline.

In accordance with another aspect of the present invention, there is provided a method for producing a multi-layered conductive polymer CNC composite comprising: providing a cellulose nanocrystal suspension/solution; providing an electrophoretic deposition system comprising a working electrode; a counter electrode; a DC power supply and a controller, wherein the working electrode, the counter electrode, the power supply and the controller are operatively connected to produce a pulsed signal, immersing the working electrode and the counter electrode in the cellulose nanocrystal suspension/solution; and applying a voltage of at least 10V across the deposition system to deposit the film on the working electrode; providing a conductive monomer solution; immersing the working electrode with the wet film in the monomer solution and electropolymerizing the conductive monomer by potentiostatic voltammetry.

In accordance with yet a further aspect of the method herein described, the conductive monomer is an aniline.

In accordance with yet another aspect of the present invention, there is provided a chiral nematic cellulose nanocrystal film comprising: self-assembled cellulose nanocrystals (CNC) forming an iridescent CNC structure, wherein the structure comprises a finger-print pattern of repeating bright and dark regions of spherulitic CNC, having a pitch, wherein the pattern is that of a plurality of distinct pseudo-planes stacked on each other in a vertical direction along an axis through the pseudo-planes and each adjacent pseudo-plane rotating an incremental fixed distance about the axis with regard to the adjacent pseudo-plane, wherein the distance along the axis required to achieve a 360° rotation of pseudo-planes is the pitch, and wherein the self-assembled cellulose nanocrystals are functionalized and the film has a variable pitch.

In accordance with still a further aspect of the film herein described, functionalized the self-assembled cellulose nanocrystals are Na—CNC, sulfated-CNC or carboxylated-CNC.

In accordance with yet still a further aspect of the film herein described, the film comprises a further outer layer of a conductive polymer.

In accordance with an embodiment of the film herein described, the conductive polymer is a polyaniline.

In accordance with still another aspect of the present invention, there is provided a multi-layered conductive polymer cellulose nanocrystal CNC composite comprising a chiral nematic cellulose nanocrystal film layer comprising: a finger-print pattern of repeating bright and dark regions of spherulitic CNC, having a pitch, wherein the pattern is that of a plurality of distinct pseudo-planes stacked on each other in a vertical direction along an axis through the pseudo-planes and each adjacent pseudo-plane rotating an incremental fixed distance about the axis with regard to the adjacent pseudo-plane, wherein the distance along the axis required to achieve a 360° rotation of pseudo-planes is the pitch, and wherein the self-assembled cellulose nanocrystals are functionalized and the pitch is variable and a layer of a conductive polymer on the film.

In accordance with another embodiment of the composite herein described, the conductive polymer is polyaniline.

In accordance with yet another embodiment of the composite herein described, the conductivity of the composites is from about 0.1 to about 2 $S \cdot cm^{-1}$.

In accordance with yet still another aspect of the present invention, there is provided an apparatus for producing a chiral nematic cellulose nanocrystal film comprising: an electrophoretic deposition system comprising a working electrode; a counter electrode: a DC power supply and a controller, wherein the working electrode, the counter electrode, the power supply and the controller are operatively connected to produce a pulsed signal, and wherein the apparatus operates at a voltage of at least 10V across the deposition system to deposit the film on the working electrode.

In accordance with still another embodiment of the apparatus herein described, the voltage applied across the deposition system is at least 30 V.

In accordance with yet still another embodiment of the method herein described, the pulsed signal is a constant voltage square-wave pulse.

In accordance with a further embodiment of the method herein described pulsed signal has a pulse width $T_{on}$ from 1 to 10 milliseconds and a $T_{off}$ from 4 to 10 milliseconds.

A scalable electrochemical process for producing CNC films and conductive CNC-based polymer nanocomposite films is described. The method used for deposition of CNC films is a pulse electrophoretic deposition in which DC current in the form of series of pulses of equal amplitude and duration ($T_{on}$) ranged from 1 to 10 milliseconds, separated by periods of zero voltage ($T_{off}$) ranged from 4 to 10 milliseconds is passed between two electrodes (anode and cathode) immersed in CNC aqueous suspension at a concentration less than 5 wt % and applying a voltage between 10 and 30V for a period of several minutes (5 to 10 minutes). The working electrode with deposited CNC layer can be used instantly for electropolymerization of aniline monomer to produce conductive CNC-based polymer nanocomposite films. This in-situ electropolymerization involves, for instance, dissolving aniline monomer in a protonic acid and applying a potentiostatic voltammetry method at a constant voltage in the range of 0.9-1.1 V for a fixed period of time (1000 seconds). An initiator such as N-phenyl-p-phenylenediamine (PPD) can be added to this solution to promote the formation of fibrillar structure of polyaniline. This electrochemical process yields adherent and smooth films after drying. CNC shows iridescent and perfectly layered structure of chiral nematic CNC crystals while CNC-Pani nanocomposite film has electrical conductivities in the range from $1.34 \times 10^{-1}$ to $1.09$ $S \cdot cm^{-1}$. This process can be useful for large scale deposition of CNC films and conductive CNC-based nanocomposite films for use in industrial applications such as anti-corrosive coatings.

BRIEF DESCRIPTION OF THE DRAWINGS

Reference will now be made to the accompanying drawings, showing by way of illustration a particular embodiment of the present invention and in which:

FIG. 4d) i) is further magnified SEM image of the sulphated CNC deposited film of FIG. 4d where the CNC film shows the characteristic layered chiral nematic structure of CNC;

FIG. 4e) i) is a further magnified SEM image of the carboxy-functionalized CNC deposited film of FIG. 4e where the CNC film shows the characteristic layered chiral nematic structure of CNC;

FIG. 7a) i): is a further magnified SEM image of the layered cross-section of electrodeposited CNC-Pani nanocomposite film according to FIG. 7a;

FIG. 7b) i): is a further magnified SEM image of the layered cross-section of electrodeposited CNC-Pani nanocomposite film according to FIG. 7b;

FIG. 7c) i): is a further magnified SEM image of a surface of the electrodeposited CNC-Pani nanocomposite film according to FIG. 7c;

FIG. 7c) ii): is a further magnified SEM image of the layered cross-section of the electrodeposited CNC-Pani nanocomposite film according to FIG. 7c;

FIG. 7d) i): is a further magnified SEM image of the layered cross-section of electrodeposited CNC-Pani nanocomposite film according to FIG. 7d;

Figure 8:
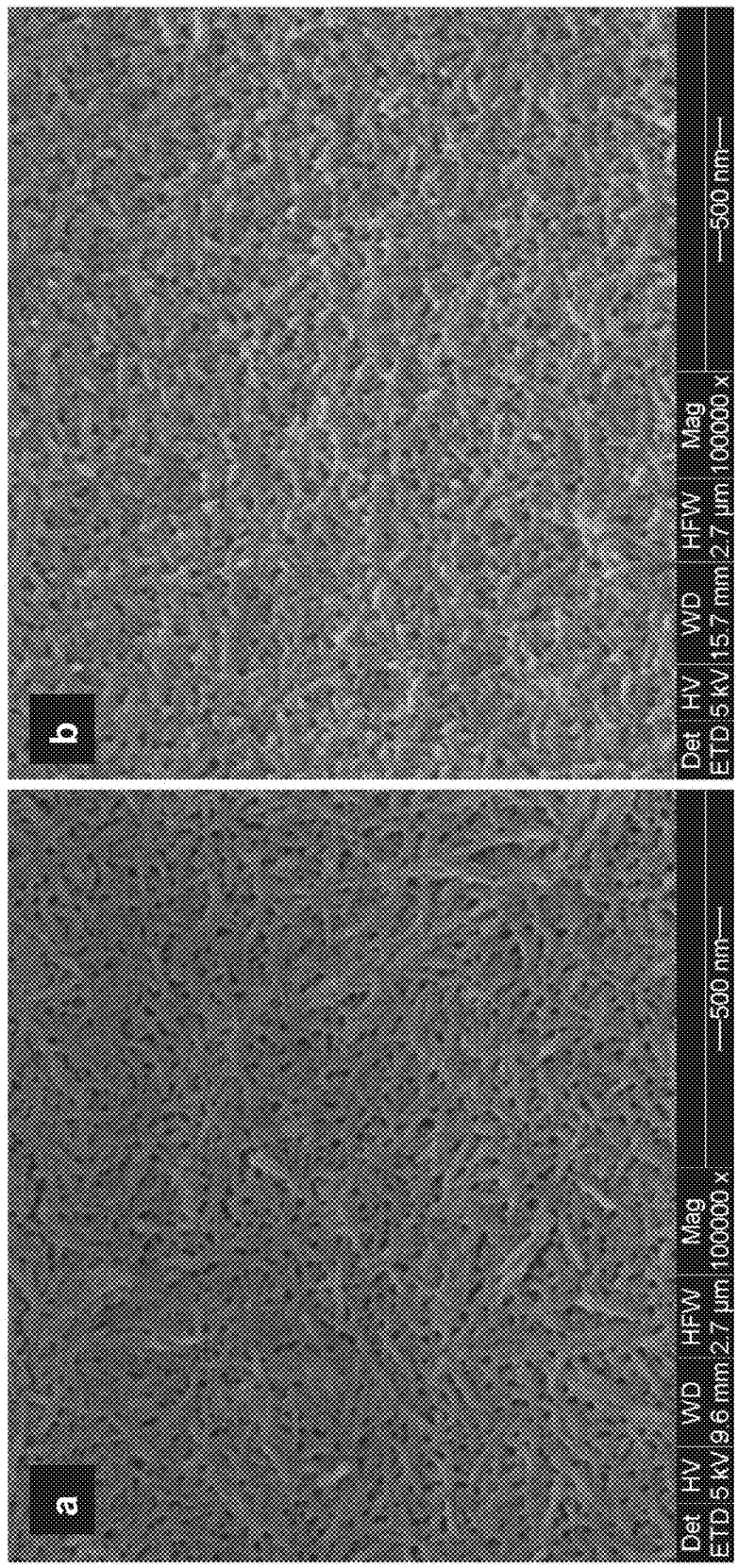

(a) is sample D, (b) is sample E, (c) is sample G, and (d) is sample H;

FIG. 8a: is an SEM image of CNC-PANI nanocomposite film prepared by chemical in-situ oxidative polymerization of aniline in the presence of initiator according to one embodiment of the present invention; and FIG. 8b: is an SEM image of CNC-PANI nanocomposite film prepared by chemical in-situ oxidative polymerization of aniline is free of initiator according to one embodiment of the present invention.

DETAILED DESCRIPTION OF PARTICULAR EMBODIMENTS

The following are acronyms are presented and defined:

EPD is Electrophoretic Deposition, is coating process depositing charged particles d on a electrode and is understood as a method described herein. EPD includes cathodic electrodeposition, anodic electrodeposition, electrophoretic coating and electrophoretic painting.

Cellulose nanocrystals (CNC) may also be defined as nanocrystalline cellulose, NCC. The cellulose nanocrystals are obtained through an acid hydrolytic process of lignocellulosic material. Examples of source material may be chemical wood pulp fibers, tunicate or agricultural fibers like kenaf. In water, CNC suspensions organize into a chiral nematic phase that can be preserved upon drying, resulting in iridescent films.

CNC-Pani nanocomposite is defined as cellulose nanocrystal and polyaniline, and understood to be a composite with desirable electronic properties.

PPD is N-phenyl-p-phenylenediamine and is understood to be an initiator that can be added to the solution of aniline in acid.

TEMPO is a chemical compound defined as 2,2,6,6-tetramethylpiperidine, or radical thereof.

SEM is understood as the acronym for a Scanning Electron Microscope or Micrograph.

PV, is understood as Potentiostatic Voltammetry, where voltammetry involves the application of a known potential to an electrode and the monitoring of the resulting current flowing through the electrochemical cell, over a period of time. Potentiostats are assembled from discrete integrated-circuit operational amplifiers and other digital modules. Potentiostatic voltammetry is voltammetric measurements by potentiostats. The following terms are defined herein.

"Dry" is defined herein in reference to a chiral nematic cellulose nanocrystal film as a film that has been exposed to at least 100° C. for a short period of time, of at least one hour, preferably at least 30 minutes, more preferably at least 15 minutes and most preferably at least 5 minutes.

"Chirality" is a property whereby a molecule or object is not superimposable with its mirror image, a molecule that is "chiral" has chirality. For example, hands are chiral since the left hand is the mirror image of the right hand, but they are not superimposable. Chirality at the molecular level allows for the assembly of large chiral structures with unique properties that are of fundamental importance in biology and pharmaceuticals. DNA double-stranded helices, for example, are chiral structures.

The "chiral nematic" (or cholesteric) liquid crystalline phase, where mesogens organize into a helical assembly, was first observed for cholesteryl derivatives but is now known to exist for a variety of molecules and polymers. One such example is cellulose nanocrystal (CNC). Mesogens are basic units of a liquid crystal inducing structural order to the crystal. The *IUPAC Compendium of Chemical Technology* (2005) defines a "mesogen" according to its physico-chemical properties in the constitution of mesophase, i.e. "liquid-crystal mesophase formation in low-molar-mass and polymeric substances". The helical organization of a chiral nematic liquid crystal results in iridescence when the helical pitch is on the order of the wavelength of visible light due to the angle-dependent selective reflection of circularly polarized light. "Iridescent" is defined a film that is bright, lustrous displaying the colors of the rainbow that change when viewed from different angles. "Self-assembled" as defined herein relates to the organization of the CNC described herein that spontaneously assemblies into an ordered structure and that without the assistance of another or outside force.

A "finger-print pattern" is one of repeating dark and light regions that are adjacent and generally aligned to each other. The finger-print pattern is produced by/derives from the nature of the spherulitic CNC structure, where the pattern is one that would be produced by a plurality of distinct pseudo-planes stacked on each other in a vertical direction along an axis through the pseudo-planes and each adjacent pseudo-plane rotating an incremental fixed distance about the axis with regard to the adjacent pseudo-plane.

"Parallel pseudo-planes are elements that are used to describe the CNC film described herein that appear as planes parallel to each other that are oriented in a main direction. A plurality of distinct pseudo-planes are stacked on each other in a vertical direction along an axis. The pseudo-planes are said to be distinct because they are free of any connection to the adjacent pseudo-planes.

An "axis" as defined herein is a line passing vertically through the distinct pseudo-planes.

"Spherulitic CNC", are molecules are that are aligned with each other and twisted relative to the main direction of the parallel pseudo-planes.

A "pitch" is defined herein as a distance along the axis required to achieve a 360° rotation of pseudo-planes.

Description of the Equation.

Equation 1: (below) is used for a Conductivity (σ) calculation:

$$\sigma = \frac{1}{\rho}$$

$$\rho = \frac{\pi}{\ln(2)} t \left(\frac{V}{I}\right)$$

where ρ is the resistivity of the sample, t is the thickness of the film, V is the voltage and l is the current. The term ln is the natural logarithm. Conductivity is typically measured in units of S·cm$^{-1}$, and resistivity in ohm·cm. Description of the Tables.

TABLE 1: Experimental conditions for electrophoretic deposition of CNC on glassy carbon, followed by electrochemical polymerization of aniline.

TABLE 2: Experimental conditions for polymerization of aniline in the presence of CNC and the initiator (PPD).

TABLE 3: A comparative table of weight, thickness and electrical conductivity of CNC-Pani nanocomposite film deposit as compared to CNC and Pani deposited alone as well as other semiconductors.

The process described herein is a one-step, ecofriendly process for producing crack-free structurally homogeneous stable chiral nematic cellulose nanocrystal (CNC) films. The synthesis of a conductive nanocomposite film based on CNC and a conductive polymer; e.g. polyaniline, using pulse electrophoretic deposition and subsequently an in-situ electrochemical polymerization can also be produced from these CNC films. This scalable process results in producing an adherent uniform CNC film with characteristic physical and optical properties unique to this nanomaterial. Further, electrochemically with a suitable conductive polymer produces a nanocomposite film based on CNC and the conductive polymer. These composite coatings are suitable for use in semiconducting applications, anti-corrosive hard coating and printed electronics.

Figure 1:
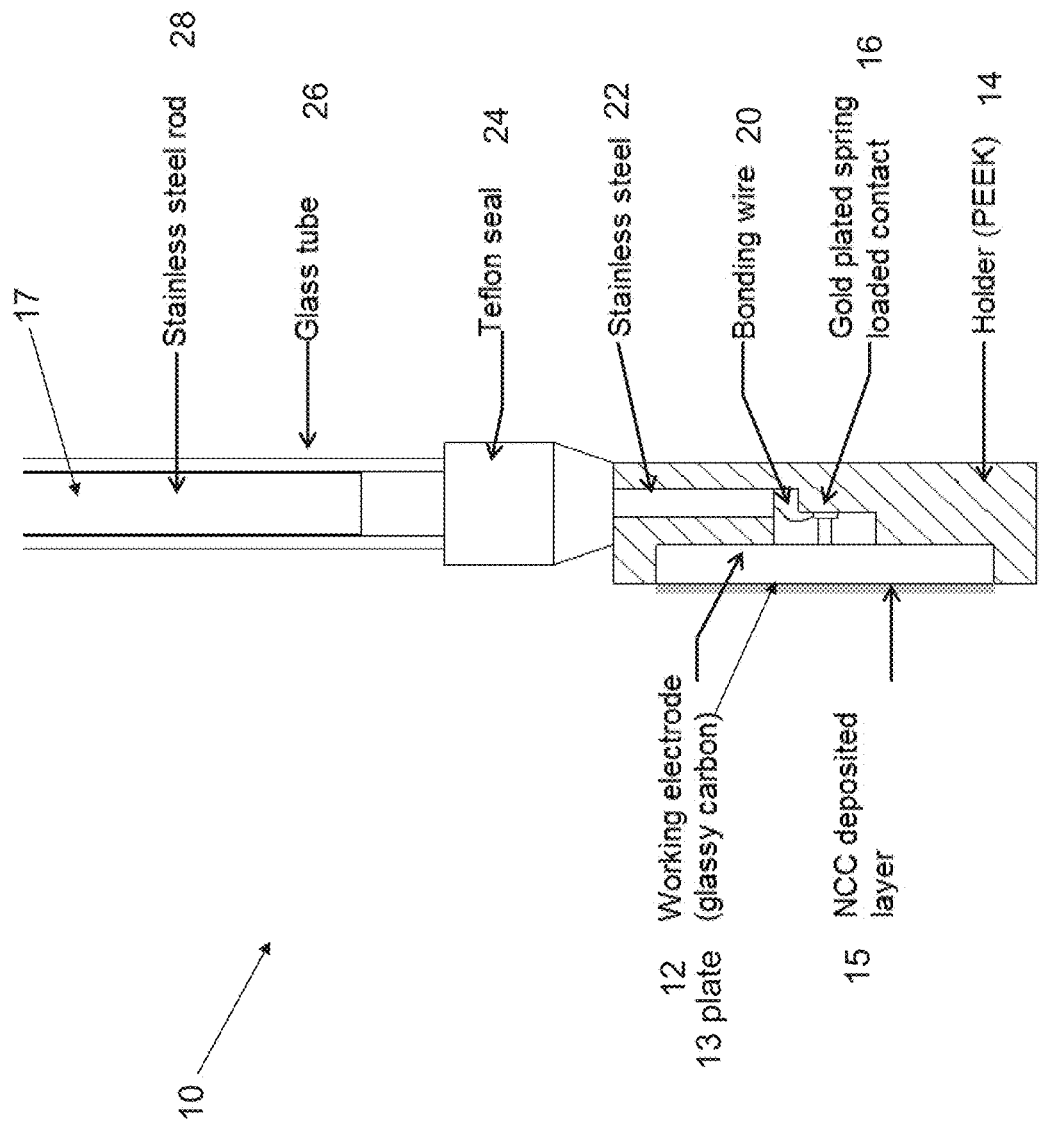
FIG. 1 is a schematic representation of a working electrode according to one embodiment of the present invention.

Referring now to FIG. 1, a representative working electrode 10 for deposition of CNC film layers 15 from a CNC suspension is illustrated.

Figure 2:
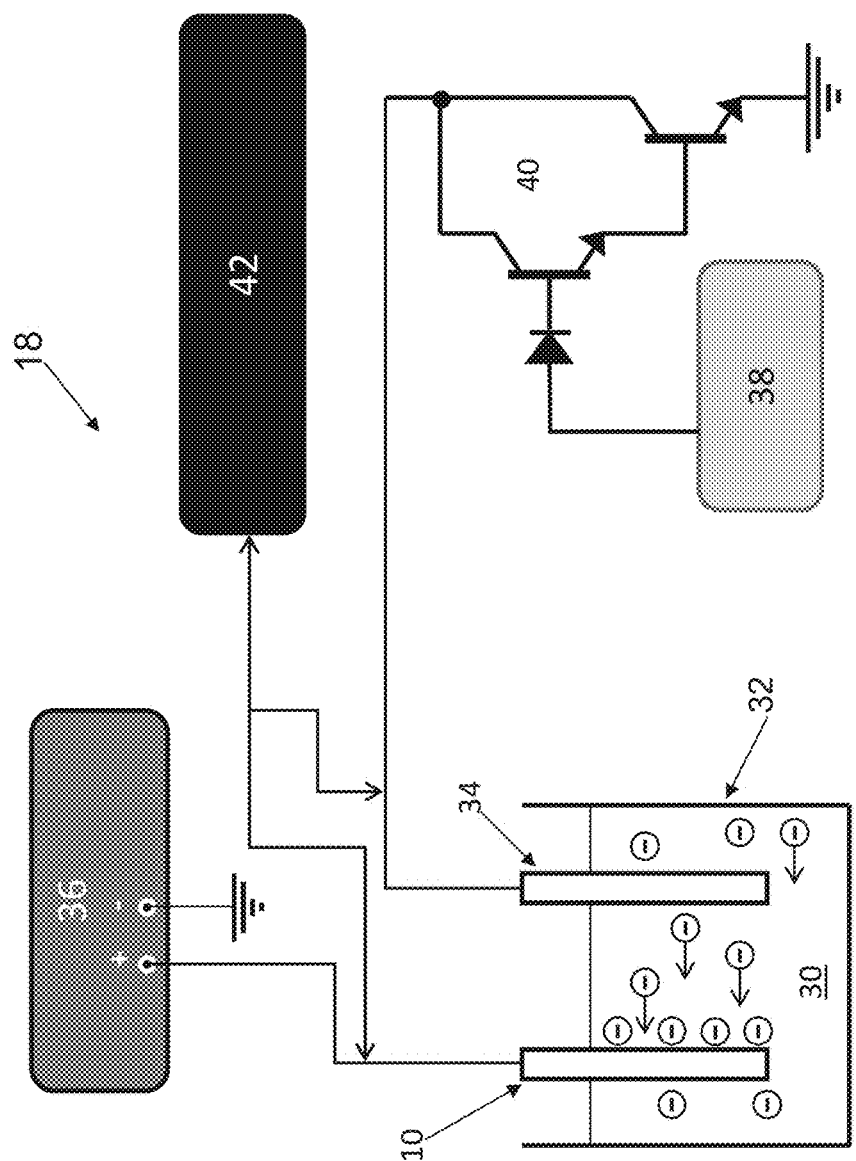
FIG. 2: is a schematic representation of an electrophoretic deposition system for a cellulose nanocrystal film according to one embodiment of the present invention.

The working electrode 10 comprises a variety of features including an immersed portion 12 (of working electrode) that is compatible with the CNC suspension 30 (FIG. 2). The immersed portion 12 of the working electrode 10 may be produced in a material selected from the group consisting of glassy carbon, platinum, and stainless steel. In a preferred embodiment the material is glassy carbon. The immersed portion of the working electrode is generally produced on a glassy carbon plate 13 that is oriented in a substantially vertical orientation and where the plate 13 in a preferred embodiment has suitable dimensions, for example 1 cm×2 cm×0.3 cm. The immersed plate 13 is mounted to a an electrically insulated electrode/plate housing 14 or holder. In a preferred embodiment the housing 14 material is a polyether ether ketone (PEEK). The working plate 13 is typically fixed to the housing 14 using an epoxy (not illustrated) and connected to the working electrode 10 end by a spring loaded contact 16, that is preferably a noble metal or corrosion resistant metal. In a preferred embodiment the spring loaded contact is a gold spring loaded contact which is imbedded into the PEEK holder 14.

In a preferred embodiment the spring loaded contact 16 is contacted with the electrical end 17 of the electrode 10 via a bonding wire 20 and typically a stainless steel connection 22 both within the housing 14. The connection 22 is attached and sealed to the electrical end 17 of the electrode 10 by a hermetic non-conductive electrode seal 24. In a preferred embodiment the seal 24 is a Teflon™, i.e. PFA ((perfluoroalkoxy) fluoropolymer) or PTFE (polytetrafluoroethylene). The seal 24 is in contact with the electrical end 17 of the electrode 10, that is in a preferred embodiment made of a stainless steel rod 28 within a glass tube 26.

Before deposition, the working plate 13 is polished with successive grades of silicon carbide paper to a 600 grit size (ANSI standards), then washed and lubricated with distilled water. The electrode plate 13 is cleaned in an ultrasonic bath and rinsed with ethanol and dried. Referring to FIG. 2, the polished glassy carbon plate 13 of the electrode 10 is hung from the electrode holder (not illustrated) into a suspension of CNC 30 into a container 32 that is generally a beaker and more preferably a glass beaker. Opposite the working electrode 10 is a counter electrode 34 (in this case a cathode) that is in a preferred embodiment a graphite rod, with preferred dimensions including a diameter of 0.6 cm and length of 12 cm hung parallel and facing the deposition (working) electrode 10 generally at a distance of 2.5 cm from the counter electrode 34.

EPD is conducted at constant voltage mode by application of a series of pulses of DC voltage of equal amplitude and duration in the same direction, separated by periods of zero voltage, using a single output programmable DC power supply 36 (Model 1786B, BK Precision) and a microcontroller (MCU) 38, preferably programmed with Arduino programming language that in a preferred embodiment is connected in series with a grounded transistor 40 and more preferably with a Darlington transistor.

Figure 3:
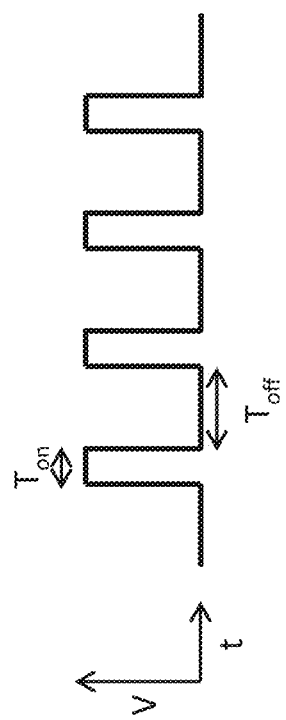
FIG. 3: is a schematic representation of a square-wave pulse signal at constant voltage used to produce the cellulose nanocrystal coating according to one embodiment of the present invention.

The constant voltage square-wave pulse was observed with a digital oscilloscope 42 (TDS 2001C, Tektronix). The duty cycle of the pulse was set at a value in the range from 10% to 50%. The height of the pulse represents the magnitude of the applied potential. As shown in FIG. 3, the pulse width $T_{on}$ which represents the portion of the cycle for which the voltage is ON ranged from 1 to 10 milliseconds while $T_{off}$, the portion of the cycle for which the voltage is OFF, ranged from 4 to 10 milliseconds. Frequency of pulse application can be changed by changing $T_{on}$ and $T_{off}$. Time of experiment can range from 5 to 10 minutes and the applied voltage between 10 and 30 V (DC). For instance, a preferred pulse current to deposit the protonated form of CNC is 1 millisecond ($T_{on}$) and 9 milliseconds ($T_{off}$) at 20V for 5 minutes. While deposition of carboxylated CNC or the sodium form of CNC, which is obtained by increasing the pH of the suspension (for instance, pH 9), can preferably be performed at pulse current of 2 milliseconds ($T_{on}$) and 9 milliseconds ($T_{off}$) at 30V for 5 minutes. During the deposition experiment, CNC suspension 30 was gently agitated using a magnetic stirrer (not illustrated) at a very slow speed. The EPD conditions are described in Table 1 (step 1).

Procedure for Electrophoretic Deposition of CNC Film:

Electrophoretic deposition (EPD) is usually carried out in a two electrode cell. The mechanism of electrophoretic deposition and with the subsequent production of a CNC polymer composite involves two steps. In the EPD first step an electric field is applied between two electrodes and charged particles suspended in a suitable liquid move towards the oppositely charged electrode, this is the electrophoresis step (in FIG. 2 negatively charged particles are illustrated moving towards the positively charged anode). At the end of the EPD step, particles accumulate at the deposition (working) electrode and create a relatively compact and homogeneous film (deposition).

In order to effectively apply this technique to processing materials, a solvent medium must be chosen such that an appreciable magnitude of surface charge is developed on the particle surface in the suspension to ensure stability of the suspension as well as facilitate high electrophoretic mobility. In general, organic solvents can be used as dispersing media in electrophoretic deposition. The use of an aqueous system has important advantages over organic solvents because environmental problems associated with organics, along with higher temperature control requirements during the process and furthermore the cost of recycling. Thus, for the present process an aqueous suspension of cellulose nanocrystal 30 (CNC) was selected.

The CNC suspension provided can be produced from bleached chemical pulp fibres using sulphuric acid hydrolysis of cellulose under strictly controlled conditions of time, temperature and acid concentration. The use of sulphuric acid imparts negatively charged, acidic sulphate ester groups at the CNC surface, resulting in stable aqueous suspensions due to electrostatic repulsion between the colloidal CNC particles. Upon drying. CNC forms an ordered arrangement of nanoparticles and in particular a helical assembly of its chiral nematic liquid crystal phase that can reflect circularly polarized light at specific wavelengths. The iridescence of CNC self-assemblies is typically characterized by the fingerprint patterns, that are understood as a patch work of bright and dark regions is typical of spherulitic behavior of liquid crystalline materials. Since CNC particles are negatively charged, the electro-deposition occurs on the positive electrode (anode) and the process is then called anodic electrophoretic deposition.

According to the present invention, electrophoretic deposition (EPD) is carried out using the square-wave pulse potential method whereby high voltage is applied to CNC suspension. A smooth CNC layer, is advantageously, substantially free of air bubbles trapped within the film can be deposited this way. "Substantially free" of air bubbles is understood to mean that there are virtually no air bubbles within the film. This is because the formation of bubbles is a consequence of water electrolysis which occurs at lower voltages leading to the generation of hydrogen and oxygen gases at the cathode and anode, respectively. One of the approaches investigated in the literature in order to inhibit water electrolysis that interferes with the deposit layer is to conduct EPD at voltages lower than the decomposition voltage of water (1.23V at 25° C.). However, is has been found that CNC deposition does not occur at this low voltage. For this reason, in a preferred embodiment a pulsed signal for CNC aqueous suspensions is used instead of using the constant voltage method. More preferably, the pulsed signal is a square-wave pulse potential method is used for the CNC.

The present deposition method has a further advantage that it can be used for the deposition on a large scale, both in terms of numbers of coatings produced and the surface area that may be coated. For example, coatings in car manufacturing.

A suspension of protonated-form ($H^+$) or sodium-form ($Na^+$) CNC at concentrations less than 5 wt % and a pH between 2 and 10 was ultrasonicated at maximum power for 10 minutes using a Fisher Sonic Dismembrator in order to break up any agglomerates. The average particle size of CNC, measured by a Zetasizer, was approximated to be 48.4 nm. Preferably, deposition of Na—CNC can take place at concentrations of 5 wt % or higher using suitable pulse current parameters—see examples below. We can also use a TEMPO (2,2,6,6-tetramethylpiperidine) oxidized CNC suspensions or any other functionalized CNC with negatively charged functional groups. Oxidation of CNC results in the addition of more negative charges, carboxylates for instance, leading to improvement in the electrophoretic movement of the negative particles towards the anode.

TABLE 1

Experimental conditions for EPD of CNC followed by EC polymerization of Aniline.

| | Sample ID | CNC concentration (wt %) | CNC used | Voltage applied (V) | Current density (mA/cm$^2$) | $T_{on}$ (ms) | $T_{off}$ (ms) | Experiment time (min) |
|---|---|---|---|---|---|---|---|---|
| Step 1 | | | | | | | | |
| Electrophoretic deposition of CNC Square-wave pulse potential method | A | 2 | Sulfated (H-form) | 20 | 54 | 1 | 9 | 5 |
| | B | 2 | | 20 | 54 | 1 | 9 | 5 |
| | C | 2 | | 20 | 54 | 1 | 9 | 5 |
| | D | 2 | | 20 | 54 | 1 | 9 | 5 |
| | E | 2 | | 30 | 80 | 1 | 9 | 5 |
| | F | 2 | | 30 | 80 | 1 | 9 | 10 |
| | G | 2 | | 20 | 60 | 2 | 9 | 5 |
| | H | 1.6 | Carboxylated | 30 | 13 | 3 | 9 | 5 |

| | Sample ID | Acid used and concentration | Aniline concentration | Initiator (PPD) concentration | Voltage (V) | Experiment time (s) |
|---|---|---|---|---|---|---|
| Step 2 | | | | | | |
| Electropolymerization of Aniline Potentiostatic voltammetry method | A | $H_2SO_4$ (1N) | 0.5M | — | 1 | 1000 |
| | B | $HClO_4$ (1N) | 0.3M | — | 1 | 1000 |
| | C | HCl (1N) | 0.3M | — | 1 | 1000 |
| | D | $H_2SO_4$ (1N) | 0.3M | — | 1 | 1000 |
| | E | $H_2SO_4$ (1N) | 0.3M | — | 1 | 1000 |
| | F | $H_2SO_4$ (1N) | 0.3M | — | 1 | 1000 |

TABLE 1-continued

Experimental conditions for EPD of CNC followed by EC polymerization of Aniline.

| | | | | | |
|---|---|---|---|---|---|
| G | $H_2SO_4$ (1N) | 0.3M | 0.003M | 1 | 1000 |
| H | $H_2SO_4$ (1N) | 0.3M | — | 1 | 1000 |

TABLE 2

Experimental conditions for chemical polymerization of aniline in the presence of CNC and the initiator (PPD)

| Sample ID | Mass ratio CNC:Aniline | Concentration of monomer (Aniline) | Concentration of Oxidant (APS) | Concentration of initiator (PPD) | Concentration of acid (HCl) | Method used |
|---|---|---|---|---|---|---|
| I | 2 | 0.04 M | 0.01 M | 0.001 M | 1 N | In-situ oxidative polymerization |

Figure 4:
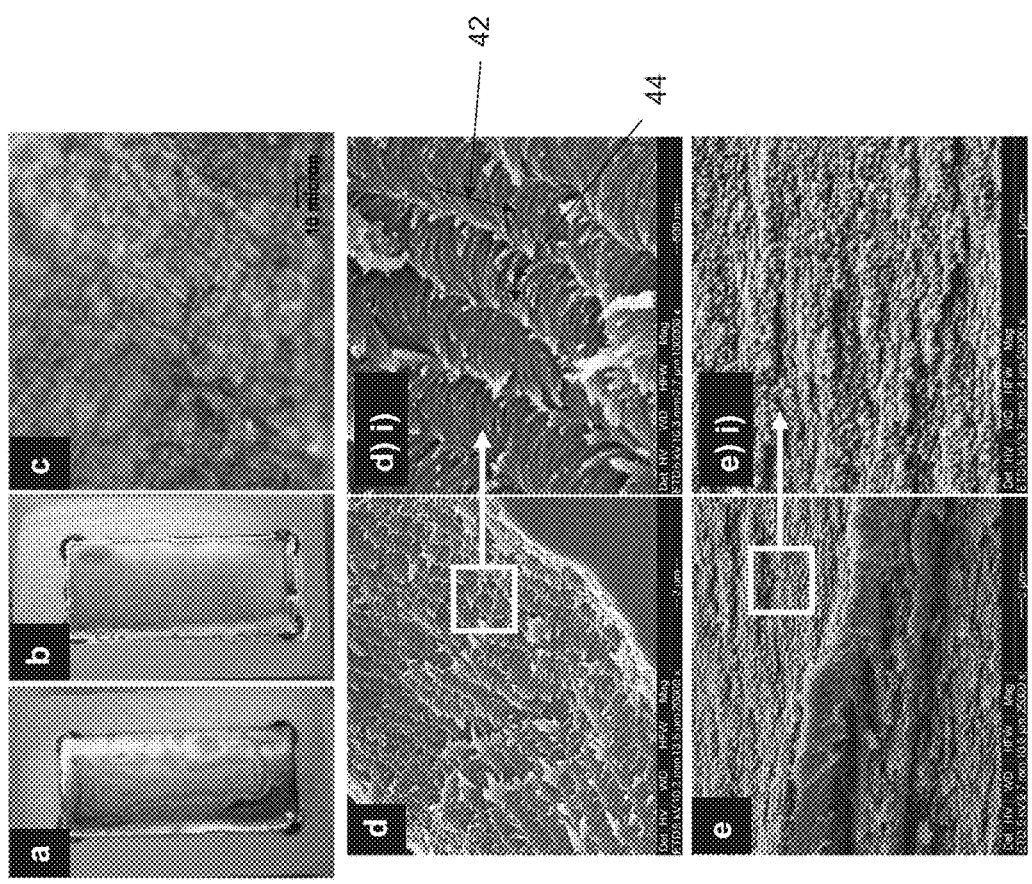
FIG. 4a is a photograph of an CNC film deposited using pulse electrophoretic deposition according to one embodiment of the present invention where the CNC film is air-dried.
FIG. 4b is a photograph of an CNC film deposited using pulse electrophoretic deposition according to one embodiment of the present invention where the CNC film is oven dried.
FIG. 4c is a photograph of an CNC film deposited using pulse electrophoretic deposition according to one embodiment of the present invention where the CNC film is a cross-polarized reflection optical image of iridescent CNC films that clearly showing the fingerprint local periodic structure (40× magnification)
FIG. 4d is an SEM image of a sulphated CNC deposited film using pulse electrophoretic deposition according to one embodiment of the present invention where the CNC film shows a characteristic layered chiral nematic structure of CNC.
FIG. 4e is an SEM image of a carboxy-functionalized CNC deposited film using pulse electrophoretic deposition according to another embodiment of the present invention where the CNC film shows a characteristic layered chiral nematic structure of CNC.

CNC films deposited using this process exhibit an iridescent smooth surface after drying at ambient conditions (FIG. 4a). In FIG. 4a the iridescent bands green, yellow and red are visible, particularly in the bottom left corner, with the darkest and broadest L shaped iridescent pattern being a green colour adjacent red and yellow bands that are substantially collinear with the green bands. The iridescent pattern in FIG. 4a runs throughout the film in a somewhat disorganized manner, while framing the film produced with a disordered border.

The CNC film deposit retains its iridescence even after drying at 100° C. for 5 minutes (FIG. 4b). After this further drying FIG. 4b iridescence is more ordered with a fine dark border (green shade) around the film and clearly visible in the lower and left hand side of the film. There is also present a fine (reddish) line below and left of the darker border described above.

The polarized optical microscope (POM) image of FIG. 4c reveals a typical iridescent film (thickness=9.84±0.99 μm) with finger-print patterns characteristic of chiral nematic structures. The darker substantially parallel lines of FIG. 4c are blueish green in nature while the lighter parallel lines next to these darker lines are reddish in color. The POM image has a generally pinkish iridescent glow throughout.

Furthermore, SEM images of FIG. 4d show a generally ordered layered structure characteristic of the helical assembly of CNC's chiral nematic structure. The enlarged zone presented in FIG. 4d) i) illustrates a fibrillar axis of a self-assembled cellulose nanocrystal. The iridescent pattern is produced by the structure, of substantially parallel ridges and valleys oriented in a main direction 42. The spherulitic CNC are also illustrated in FIG. 4d) i) and are represented by reference 44. As can be seen the spherulitic CNC 44 are aligned and generally perpendicular to relative to the main direction 42. Sulphated CNC film is illustrated in FIG. 4d) i).

The electrodeposited carboxylated CNC film of FIG. 4e shows a layered structure, that appears less ordered than sulfated CNC. The parallel ridges and valleys of the spherulic CNC are clearly visible in FIG. 4e) i) as substantially parallel round mounds running substantially horizontally across FIG. 4d) i).

Procedures for Producing Conductive CNC-Based Polymer Nanocomposite Films:

In preparing a conductive CNC based polymer nanocomposite a further step may be included in the process that is related to the in-situ electrochemical polymerization of aniline onto electrophoretically deposited CNC in order to make a conductive nanocomposite based on cellulose nanocrystal and a conductive polymer like polyaniline. Polyaniline (Pani) is one of the promising conducting polymers due to its ease of synthesis, environmental stability and relatively low cost. Pani can be found in a variety of applications including specifically anticorrosion coatings. Polyaniline can be synthesized chemically or electrochemically.

At the end of EPD experiment (the first step), the working electrode with deposited CNC layer on it is immersed as quickly as possible in a solution composed of sulphuric acid (1N) and aniline monomer (0.3M-0.5M). Then, the aniline is electropolymerized by potentiostatic voltammetry method at a constant voltage in the range of 0.9-1.1V for 1000 seconds versus a reference electrode Ag/AgCl. The potentiostatic voltammetry conditions were maintained using Potentiostat/Galvanostat/ZRA (Gamry Instruments Reference 600). Table 1 (step 2) shows the electrochemical polymerization conditions used for this process.

Figure 5:
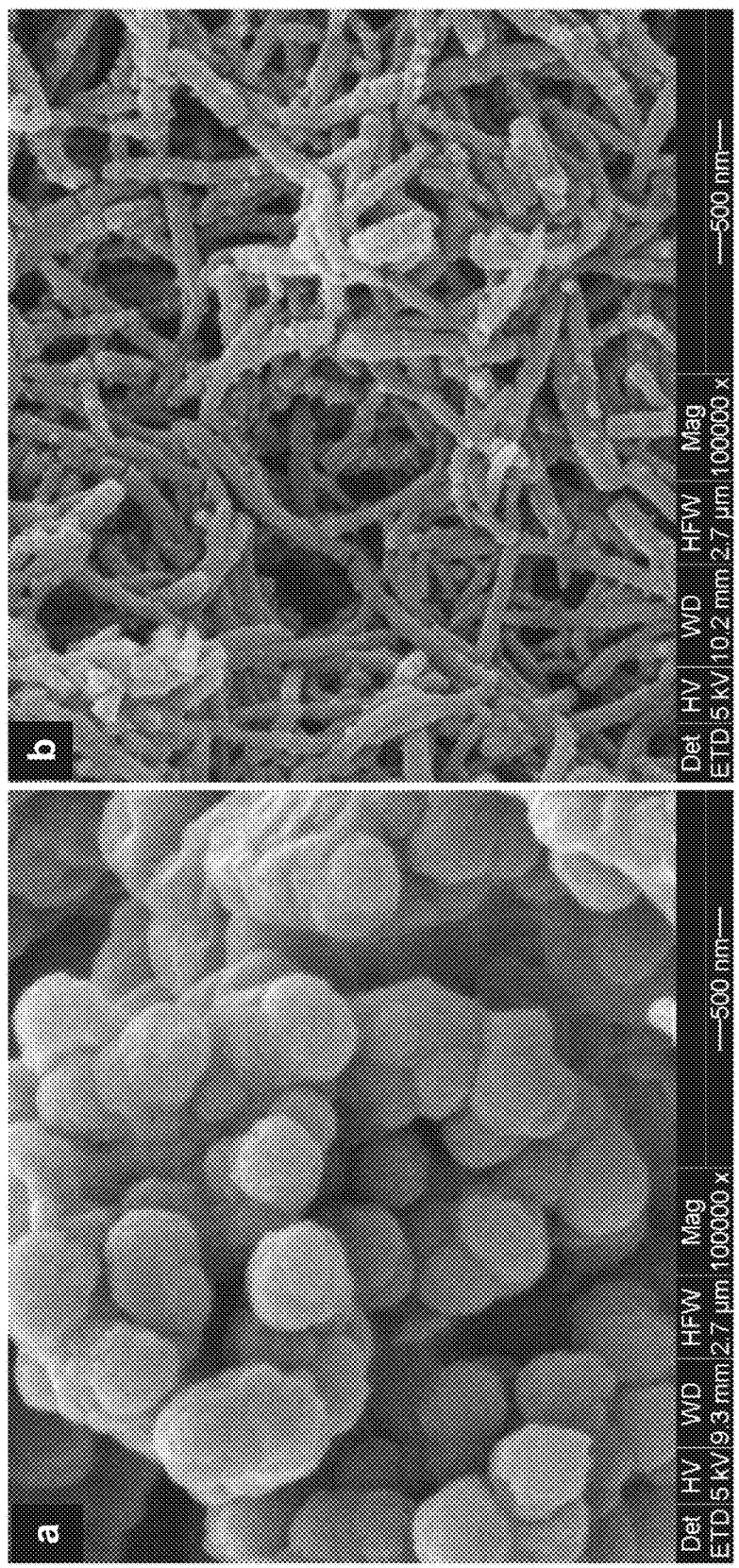
FIG. 5a: is an SEM images of a polyaniline after electrochemical polymerization of aniline free of an initiator.
FIG. 5b: is an SEM images of a polyaniline after electrochemical polymerization of aniline in the presence of an initiator.

The above described electrochemical polymerization method is not limited to the use of aniline as the monomer. Other monomers can be used including pyrrole, thiophene and acetylene. The choice of different monomers is dependent on the final application. The electropolymerization of aniline monomer can also be carried out in other acidic aqueous solutions such as hydrochloric acid and perchloric acid. This low pH is required to solubilise the monomer and to generate the emeraldine salt as the only conducting form of polyaniline. An initiator such as N-phenyl-p-phenylenediamine (PPD) can also be added to the solution of aniline in acid. This initiator promotes the formation of nanofibrillar morphology visible in FIG. 5b during the electrochemical polymerization of aniline and not a bulk granular morphology illustrated in FIG. 5a.

CNC-PANI nanocomposite films can also be prepared chemically in the presence of initiator (PPD) by in-situ oxidative polymerization using ammonium persulfate as the oxidant. Table 2 gives the experimental conditions for this process.

Constant potential or potentiodynamic techniques are generally employed because the overoxidation potential for polyaniline is very close to that required for monomer oxidation. Both steps, electrophoretic deposition and electrochemical polymerization, were carried out at 20±1° C. The electrodeposited CNC-Pani nanocomposite film was rinsed with de-ionized water several times and air dried at room temperature for 24 h.

Figure 6:
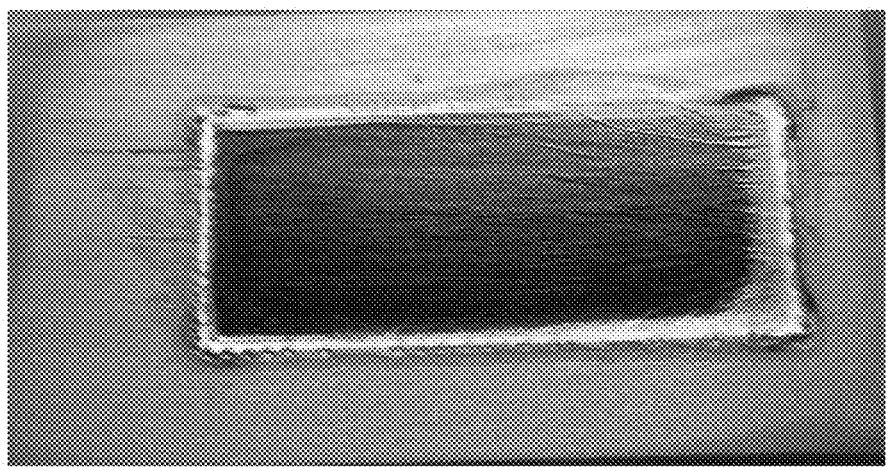
FIG. 6: is a photograph of a deposited CNC-Pani (polyaniline) nanocomposite film according to one embodiment of the present invention.

The two-step electrochemical process (EPD of CNC followed by EC polymerization of a conductive monomer) yields an adherent smooth film of conducting CNC-based nanocomposite film as shown in FIG. 6.

Figure 7:
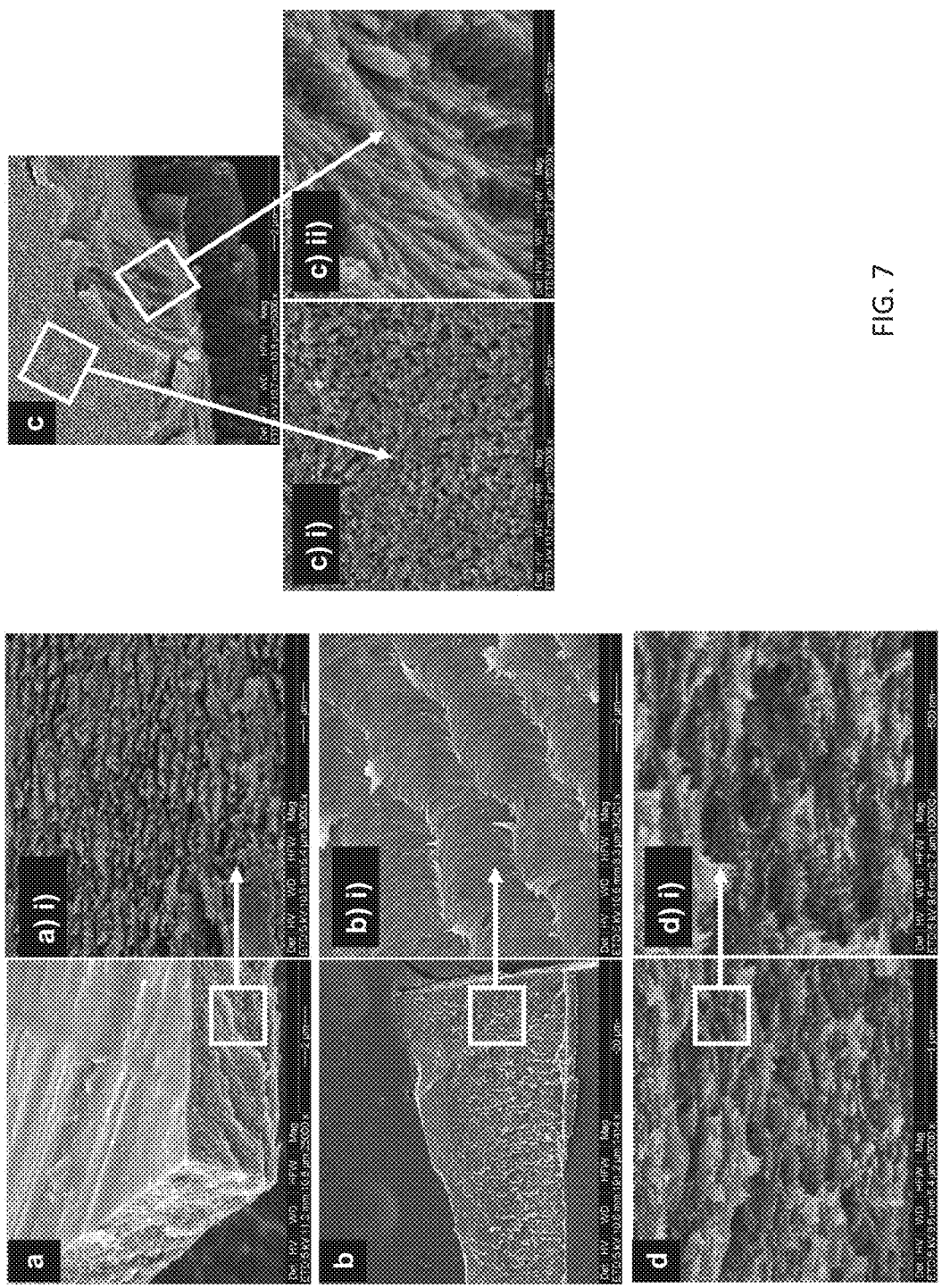
FIG. 7a: is an SEM image of a cross-section of electrodeposited CNC-Pani nanocomposite film according to sample D presented herein.
FIG. 7b: is an SEM image of a cross-section of electrodeposited CNC-Pani nanocomposite film according to sample E presented herein.
FIG. 7c: is an SEM image of a cross-section of electrodeposited CNC-Pani nanocomposite film according to sample G presented herein.
FIG. 7d: is an SEM image of a cross-section of electrodeposited CNC-Pani nanocomposite film according to sample H presented herein.

All of the FIG. 7 clearly illustrate the presence of the layered structure characteristic of CNC in these films, where the chiral nematic orientation of the CNC nanocrystals is also clearly apparent. It is important to note that the CNC polymer composite films possess the same homogeneous morphology, whether prepared chemically or electrochemically.

The amount of electrodeposited CNC-Pani nanocomposite film was determined gravimetrically (weight of the working electrodes before and after electrodeposition). These films have different weights depending on the voltage applied for CNC deposition, and concentration of the monomer, e.g., aniline, used in the electropolymerization step.

These composite films have been produced with tunable electrical conductivities from 0.1 to 2.0 S·cm$^{-1}$. Specific examples ranging from 1.34×10.1 to 1.09 S·cm$^{-1}$ are presented in Table 2. These values of conductivities are in the range of known semiconductors, e.g., germanium and silicon. Electrical conductivities (σ) of the various samples were measured using the four-probe method based on equation 1, previously described, where p is the resistivity of the sample. We note that the CNC-Pani nanocomposite films were peeled off the glassy carbon electrodes before conducting conductivity measurements. The thickness of CNC-PANI nanocomposite films varies from 1 to 50 μm, preferably from 3 μm to 45 μm depending on the electrochemical conditions used.

Example 1

Electrochemical Deposition of CNC-Pani Nanocomposite Film without Addition of Initiator 100 mL of CNC suspension (protonated form) at a concentration of 2 wt % and average particle size of 48.4 nm was ultrasonicated at 60% for 10 minutes before deposition. EPD experiments of CNC suspension were carried out on glassy carbon (GC) plates of 1 cm×2 cm×0.3 cm dimensions mounted onto polyether ether ketone (PEEK) holder. The square-wave pulse EPD was conducted by applying a constant voltage of 20V (DC) separated by periods of zero voltage using the set-up described in FIG. 2. The duty cycle was set at a constant value of 10%. The pulse width $T_{on}$ was fixed at 1 millisecond while $T_{off}$ was fixed at 9 milliseconds. Pulse frequency was 100 Hz, the current density was about 54 mA/cm$^{-2}$ and time of experiment was set at 5 minutes. CNC was gently agitated, during the deposition, using a magnetic stirrer at a very slow speed. Once the EPD experiment of CNC is terminated, the glassy carbon electrode with CNC deposited on it was immersed instantly in a solution composed of sulphuric acid (1N) and aniline monomer (0.3M). Then, aniline was electropolymerized by potentiostatic voltammetry method at a constant voltage of 1V for 1000 seconds versus a reference electrode Ag/AgCl. The potentiostatic voltammetry conditions were maintained using Potentiostat/Galvanostat/ZRA (Gamry Instruments Reference 600). The experiment was carried out at 20±1° C. The electro-deposited CNC-Pani film was rinsed with de-ionized water for several times and air dried at room temperature for 24 h. FIG. 8b is an SEM of a CNC-Pani composite produced without an initiator.

Example 2

Electrochemical Deposition of CNC-Pani Nanocomposite Film in the Presence of Initiator (PPD)

100 mL of CNC suspension (protonated form) at a concentration of 2 wt % and average particle size of 48.4 nm was ultrasonicated at 60% for 10 minutes before deposition. EPD experiments of CNC suspension were carried out on glassy carbon (GC) plates of 1 cm×2 cm×0.3 cm dimensions mounted onto polyether ether ketone (PEEK) holder. The square-wave pulse EPD was conducted by applying a constant voltage of 20V (DC) separated by periods of zero voltage using the set-up described in FIG. 2. The pulse width $T_{on}$ was fixed at 2 milliseconds while $T_{off}$ was fixed at 9 milliseconds. Pulse frequency was 91 Hz, the current density was about 60 mA/cm$^2$ and time of experiment was set at 5 minutes. CNC was gently agitated, during the deposition, using a magnetic stirrer at a very slow speed. Once the EPD experiment of CNC is terminated, the glassy carbon electrode with CNC deposited on it was immersed instantly in a solution composed of sulphuric acid (1N) and aniline monomer (0.3M) and the initiator N-phenyl-p-phenylenediamine (0.003M) dissolved beforehand in 1 mL of methanol. Then, aniline was electropolymerized potentiostatically at 1V (Ag/AgCl) for 1000 seconds. The potentiostatic voltammetry conditions were maintained using a Potentiostat (Gamry Instruments Reference 600). The experiment was carried out at 20±1° C. The electro-deposited CNC-Pani nanocomposite film was rinsed with de-ionized water for several times and air dried at room temperature for 24 h. FIG. 8a is an SEM of the surface of a CNC-Pani composite according to the present invention when an initiator is used.

Example 3

Chemical Preparation of CNC-Pani Nanocomposite Film in the Presence of Initiator (PPD) Using the In-Situ Oxidative Polymerization Method 37 mg (0.001 M) of N-phenyl-p-phenylenediamine (PPD) was dissolved in 5 ml of Methanol, and the resulting solution added to a mixture of 0.73 ml (0.04 M) aniline dissolved in 63 ml of HCl (1M) and 32 ml of CNC suspension (4.7 wt. %) sonicated beforehand 10 minutes at 60%. The mixture was stirred for 30 minutes then a solution of 0.46 g (0.01 M) of ammonium persulfate, dissolved in 100 ml of HCl (1M), was rapidly mixed with the CNC/anilinium/PPD/HCl slurry. The polymerization is allowed to proceed under stirring at room temperature for 24 hours. The crude suspension was purified by dialysis against deionized water for 1 week. The purified PANI-CNC suspension is dispersed by mixing it for 15 minutes at 500 rpm using a mechanical stirrer followed by sonication at 60% power for 10 minutes. The purified nanocomposite suspension was finally doped by mixing the suspension with a solution of HCl (1N) for 48 hours and air dried at ambient conditions.

Example 4

Electrochemical Deposition of CNC-Pani Nanocomposite Film Using Carboxy-Functionalized CNC 100 mL of carboxylated CNC suspension at a concentration of 1.6 wt % was ultrasonicated at 60% for 10 minutes before deposition. Carboxylated CNC was prepared by oxidation of CNC using, for example, the TEMPO method as follows [12]: 200 mL of CNC suspension with a concentration of 4.7 wt % was first diluted with 200 mL of DI water and sonicated at 60% for 10 minutes. Then, mixed with 0.94 g of TEMPO [2,2,6,6-tetramethyl-1-(piperidinyloxy) radical] and 9.4 g of NaBr and mixed for ~1 hour. The oxidation was started by the addition of 48 mL of NaClO solution at a concentration of 9.72%. The mixture was stirred for 4 hours at room temperature with the pH adjusted to 10-11 by 3N NaOH. The carboxylated CNC was purified by the addition of 35 g of NaCl and centrifugation. The product was further washed by redispersing it in 1 M NaCl followed by centrifugation. This washing step was repeated twice in order to remove the remaining NaOCl, and conversion of the carboxyls to free acid form was achieved by 2 more washings with 0.1 N HCl. Finally, the product was dialyzed against deionized water for 5 days. At this stage, the carboxylated CNC became a well dispersed colloidal suspension. For this specific process, the yield obtained of this reaction=77%, pH of the final suspension=3.99, and conductivity of the final suspension=194.2 µS/cm.

Electrophoretic deposition experiments of carboxylated CNC suspension were carried out on glassy carbon (GC) plates of 1 cm×2 cm×0.3 cm dimensions mounted onto polyether ether ketone (PEEK) holder. The square-wave pulse EPD was conducted by applying a constant voltage of 30V (DC) separated by periods of zero voltage using the set-up described in FIG. 2. The duty cycle was set at 25%. The pulse width $T_{on}$ was fixed at 3 milliseconds while $T_{off}$ was fixed at 9 milliseconds. Pulse frequency was 83 Hz, the current density was about 13 mA/cm$^2$ and time of experiment was set at 5 minutes. CNC was gently agitated, during the deposition, using a magnetic stirrer at a very slow speed. Once the EPD experiment of CNC is terminated, the glassy carbon electrode with a translucent gel layer of carboxylated CNC deposited on it was immersed instantly in a solution composed of sulphuric acid (1N) and aniline monomer (0.3M). Then, aniline was electropolymerized potentiostatically at 1V (Ag/AgCl) for 1000 seconds. The potentiostatic voltammetry conditions were maintained using a Potentiostat (Gamry Instruments Reference 600). The experiment was carried out at 20±1° C. The electro-deposited CNC-Pani film was rinsed with de-ionized water for several times and air dried at room temperature for 24 h.

FIG. 7b and FIG. 7b) i) are respectively an SEM of a composite film of sample E presented in Table 3 and an enlarged area of a cross-section through the thickness of the film.

FIG. 7c is an SEM of a composite film of sample G of Table 3. The enlarged area of FIG. 7c) i) illustrates the surface features of the sample G, while the enlarge area represented in FIG. 7c) ii) illustrates the layered features through a section of the film of sample G.

FIG. 7d is a further SEM of a composite film of sample H presented in Table 3 illustrating a cross-section of the film and in FIG. 7d) i) an enlarged cross section of the layered features of the film.

The embodiments of the invention described above are intended to be exemplary. Those skilled in the art will therefore appreciate that the foregoing description is illustrative only, and that various alternate configurations and modifications can be devised by the skilled person. Accordingly, the present invention is intended to embrace all such alternate configurations, modifications and variances which fall within the scope of the appended claims. The scope of the claims should not be limited by the preferred embodiments set forth in the examples, but should be given the broadest interpretation consistent with the description as a whole.

The invention claimed is:

1. A method for producing a chiral nematic cellulose nanocrystal film comprising:
   providing a functionalized cellulose nanocrystal suspension;
   providing an electrophoretic deposition system comprising:
      a working electrode;
      a counter electrode;
      a DC power supply; and
      a controller,

TABLE 3

Weight, thickness and electrical conductivity of CNC-Pani nanocornposite film deposit compared to CNC and Pani deposited alone.

| Sample ID | Weight of CNC-Pani nanocomposite deposited film (mg) | Thickness of CNC-Pani nanocomposite deposited film (µm) | Conductivity of CNC-Pani nanocomposite deposited film (S/cm) |
|---|---|---|---|
| A | 4.55 | 4.36 ± 1.05 | $6.17 \times 10^{-1} \pm 1.30 \times 10^{-1}$ |
| B | 3.20 | 3.71 ± 0.48 | $1.34 \times 10^{-1} \pm 6.66 \times 10^{-2}$ |
| C | 3.52 | 6.26 ± 0.85 | $3.18 \times 10^{-1} \pm 4.54 \times 10^{-3}$ |
| D | 4.53 | 5.81 ± 0.17 | $2.77 \times 10^{-1} \pm 8.07 \times 10^{-2}$ |
| E | 3.97 | 6.57 ± 0.83 | $1.68 \times 10^{-1} \pm 1.12 \times 10^{-1}$ |
| F | 14.36 | 22.38 ± 2.16 | $1.75 \times 10^{-1} \pm 8.25 \times 10^{-2}$ |
| G | 8.57 | 11.89 ± 1.38 | $7.36 \times 10^{-1} \pm 3.06 \times 10^{-1}$ |
| H | 43.33 | 34.52 ± 6.15 | $1.09 \pm 1.29 \times 10^{-1}$ |
| I | — | 46.43 ± 4.86 | $6.5 \times 10^{-3} \pm 9.97 \times 10^{-4}$ |
| CNC (sulfated)[a] | 2.13 | 9.84 ± 0.99 | — |
| CNC (carboxylated)[b] | 86.65 | 69.45 ± 2.58 | — |
| Pani[c] | 12.06 | 95.25 ± 11.7 | $5.07 \times 10^{-1} \pm 7.54 \times 10^{-2}$ |
| Germanium [10] | — | — | $2.2428 \times 10^{-2}$ |
| Silicon [10] | — | — | $0.4325 \times 10^{-5}$ |

[a]EPD conditions for deposition of sulfated CNC: 20 V, $T_{on}$ = 1 ms, $T_{off}$ = 9 ms, Experiment time = 5 min.
[a]EPD conditions for deposition of carboxylated CNC; 30 V, $T_{on}$ = 5 ms, $T_{off}$ = 5 ms, Experiment time = 5 min.
[c]Polyaniline prepared electrochemically with the addition of initiator (PPD) in $H_2SO_4$ as solvent and using the potentiostatic voltammetry method.

FIG. 7a is an SEM of a composite film of approximately 1 µm thickness of sample D found in Table 3, cut at approximately 90° angle. FIG. 7a) i) is an enlargement of the layer spherulitic structure present in the layers of sample D.

wherein the working electrode, the counter electrode, the power supply and the controller are operatively connected to produce a pulsed signal,
immersing the working electrode and the counter electrode in the cellulose nanocrystal suspension; and applying a voltage of at least 10V across the deposition system to deposit the film on the working electrode.

2. The method of claim 1, wherein the voltage applied across the deposition system is at least 30 V.

3. The method of claim 2, wherein the pulsed signal is a constant voltage square-wave pulse.

4. The method of claim 3, wherein pulsed signal has a pulse width $T_{on}$ from 1 to 10 milliseconds and a $T_{off}$ from 4 to 10 milliseconds.

5. The method of claim 1, further comprising drying the film for at least 5 minutes at 100° C. to produce a dry chiral nematic cellulose nanocrystal film.

6. The method of claim 1, further comprising:
providing a conductive monomer solution;
immersing the working electrode in the monomer solution, and
electropolymerizing the conductive monomer by potentiostatic voltammetry.

7. The method of claim 6, wherein the conductive monomer is an aniline.

8. A method for producing a conductive polymer-cellulose nanocrystal (CNC) composite having a layered cross-section, comprising:
providing a cellulose nanocrystal suspension;
providing an electrophoretic deposition system comprising:
a working electrode;
a counter electrode;
a DC power supply; and
a controller,
wherein the working electrode, the counter electrode, the power supply and the controller are operatively connected to produce a pulsed signal,
immersing the working electrode and the counter electrode in the cellulose nanocrystal suspension/solution, and
applying a voltage of at least 10V across the deposition system to deposit a cellulose nanocrystal film on the working electrode,
providing a conductive monomer solution;
immersing the working electrode with the film in the monomer solution and electropolymerizing the conductive monomer by potentiostatic voltammetry which forms the conductive polymer-CNC composite.

9. The method of claim 8, wherein the conductive monomer is an aniline.

10. A chiral nematic cellulose nanocrystal film produced by the method of claim 1, comprising:
self-assembled cellulose nanocrystals (CNC) forming an iridescent CNC structure, and
a conductive polymer;
wherein the structure comprises
a finger-print pattern of repeating bright and dark regions of spherulitic CNC, having a pitch,
wherein the pattern is that of a plurality of distinct pseudo-planes stacked on each other in a vertical direction along an axis through the pseudo-planes and each adjacent pseudo-plane rotating an incremental fixed distance about the axis with regard to the adjacent pseudo-plane, wherein the distance along the axis required to achieve a 360° rotation of pseudo-planes is the pitch, and
wherein the self-assembled cellulose nanocrystals are functionalized and the film has a variable pitch.

11. The film of claim 10, wherein the self-assembled cellulose nanocrystals are functionalized with Na—CNC, sulfated-CNC or carboxylated-CNC.

12. The film of claim 10, wherein the conductive polymer is a polyaniline.

13. A conductive polymer-cellulose nanocrystal (CNC) composite having a layered cross-section, comprising:
a chiral nematic cellulose nanocrystal comprising:
a finger-print pattern of repeating bright and dark regions of spherulitic CNC, having a pitch,
wherein the pattern is that of a plurality of distinct pseudo-planes stacked on each other in a vertical direction along an axis through the pseudo-planes and each adjacent pseudo-plane rotating an incremental fixed distance about the axis with regard to the adjacent pseudo-plane, wherein the distance along the axis required to achieve a 360° rotation of pseudo-planes is the pitch, and
wherein the self-assembled cellulose nanocrystals are functionalized and the pitch is variable, and
a conductive polymer.

14. The composite of claim 13, wherein the conductive polymer is polyaniline.

15. The composite of claim 14, wherein the conductivity of the composite is from about 0.1 to about 2 S·cm$^{-1}$.

* * * * *